(12) United States Patent
Desard

(10) Patent No.: US 11,300,744 B2
(45) Date of Patent: Apr. 12, 2022

(54) SEALING BODY FOR TELECOMMUNICATION CABLES

(71) Applicant: Corning Research & Development Corporation, Corning, NY (US)

(72) Inventor: Christophe Desard, Herbignac (FR)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/663,569

(22) Filed: Oct. 25, 2019

(65) Prior Publication Data

US 2020/0057221 A1 Feb. 20, 2020

Related U.S. Application Data

(63) Continuation of application No. PCT/IB2018/052521, filed on Apr. 10, 2018.

(30) Foreign Application Priority Data

Apr. 25, 2017 (EP) .................................... 17167860

(51) Int. Cl.
*G02B 6/44* (2006.01)
(52) U.S. Cl.
CPC ................. *G02B 6/4439* (2013.01)
(58) Field of Classification Search
CPC .. H02G 15/013; H02G 15/04; H02G 15/1813; G02B 6/4444; G02B 6/4439
See application file for complete search history.

(56) References Cited

U.S. PATENT DOCUMENTS

| 5,155,303 A | 10/1992 | Bensel et al. |
| 5,783,778 A * | 7/1998 | Foss ..................... H02G 15/013 174/77 R |
| 6,487,344 B1 | 11/2002 | Naudin et al. |
| 8,487,188 B2 | 7/2013 | Okuhara et al. |
| 9,343,890 B2 | 5/2016 | Pelletier |
| 2005/0029807 A1* | 2/2005 | Montena ............... H02G 15/085 285/151.1 |
| 2006/0172593 A1 | 8/2006 | Kobayashi et al. |
| 2011/0211326 A1 | 9/2011 | Drouard et al. |

(Continued)

FOREIGN PATENT DOCUMENTS

| CN | 203910297 U | 10/2014 |
| DE | 4225263 C1 | 2/1994 |

(Continued)

OTHER PUBLICATIONS

European Patent Application No. EP17167860.0 Extended Search Report dated Oct. 4, 2017, 7 Pages, European Patent Office.

(Continued)

*Primary Examiner* — Thomas A Hollweg
*Assistant Examiner* — Mary A El-Shammaa
(74) *Attorney, Agent, or Firm* — Tamika A. Crawl-Bey

(57) ABSTRACT

This disclosure describes a sealing body (2) for sealing a telecommunication cable in a port entry device. The sealing body has
a) a passageway for receiving a section of the cable,
b) a base (31) forming a first axial portion of the passageway, and
c) a segmented tubular wall (40, 41), elastically deformable and radially compressible, forming an adjacent second axial portion of the passageway.

15 Claims, 5 Drawing Sheets

(56) References Cited

U.S. PATENT DOCUMENTS

2014/0318856 A1* 10/2014 Carman ................ H02G 3/083
                                                        174/655
2020/0088964 A1*  3/2020 Desard ................ G02B 6/4471

FOREIGN PATENT DOCUMENTS

| EP | 0514174 A1 | 11/1992 | |
|----|---|---|---|
| EP | 0978745 A1 | 2/2000 | |
| EP | 2248703 A1 | 11/2010 | |
| JP | 2004159459 A | 6/2004 | |
| WO | WO-9613080 A2 * | 5/1996 | ........... H02G 15/105 |
| WO | WO-2010047920 A2 * | 4/2010 | ........... H02G 3/0675 |
| WO | 2013092252 A1 | 6/2013 | |
| WO | WO-2014139102 A1 * | 9/2014 | ........... G02B 6/4444 |
| WO | WO-2018048910 A2 * | 3/2018 | ............. G02B 6/445 |

OTHER PUBLICATIONS

International Search Report and Written Opinion of the International Searching Authority; PCT/IB2018/052521; dated Aug. 27, 2018; 12 Pages; Korean Intellectual Property Office.
European Patent Application No. EP17167860.0 Extended Search Report dated Feb. 19, 2020, 6 Pages, European Patent Office.
European Patent Application No. 17167860.0 Decision to grant a European patent dated Mar. 12, 2021; 2 Pages; European Patent Office.
European search opinion dated Oct. 4, 2017 for EP Application No. 17167860.

* cited by examiner

SEALING BODY FOR TELECOMMUNICATION CABLES

This application is a continuation of International Application No. PCT/IB2018/052521, filed Apr. 10, 2018 which claims the benefit of priority to European Application No. 17167860.0, filed Apr. 25, 2017, each application is incorporated herein by reference in its entirety.

The present disclosure relates to sealing bodies for telecommunication cables, in particular to sealing bodies facilitating sealed entry of telecommunication cables into closures through a port entry device. It also relates to port entry devices, kits of parts, and communication networks comprising such sealing bodies.

Where telecommunication cables are interrupted, such as for branching, splicing, or for performing a repair, closures are often used to protect the affected portion of the cables against humidity and other environmental impacts. A wall of such a closure has one or more openings or "ports" through which cables can be routed into the closure. In order to prevent water and humidity from entering the closure, the cable must be sealed at the port. To facilitate sealed entry of a cable through a port into the closure, so-called port entry devices are used. Amongst other functions, they seal the cable at the port, by providing a first seal between the cable and the port entry device and a second seal between the port entry device and a surface of the port.

Sealing between the cable and a surface of the port entry device can be achieved, for example, via a sealing body such as an O-ring, arranged circumferentially around the cable. An element of the port entry device is used to compress the sealing body axially, so that it expands radially and is urged against the cable surface and against a sealing surface of the port entry device, thereby sealing the gap between the cable and the sealing surface.

An example of such a sealing body is shown in the European Patent Application EP 0978745 A1. A nut pushes pressure lamellae together to compress a continuous sealing ring around the cable.

It is desirable to reduce the number of parts required for sealing in a port entry device. It is also desirable to achieve sealing of a wider spectrum of cable diameters with only one sealing body.

The present disclosure attempts to address these needs. This disclosure provides a sealing body for sealing a gap between a telecommunication cable and a surface of a port entry device, the sealing body comprising
  a) a passageway for receiving a section of the cable, comprising a first axial portion and an adjacent, coaxial second axial portion,
    wherein the length direction of the passageway defines axial directions, with radial directions being directions orthogonal to the axial directions,
  b) a base forming the first axial portion of the passageway, and
  c) a segmented tubular wall, elastically deformable and radially compressible, forming the second axial portion of the passageway.

Due to the segmented tubular wall being deformable and radially compressible, the segmented wall can provide efficient sealing for a wide range of cable diameters. The fact that the wall is segmented allows adaptation to a wider range of cable diameters than traditional, non-segmented walls. The segmented wall can be radially compressed by a compression element, to such as a compression nut, so that a separate lamellae ring to compress a traditional, non-segmented sealing body is not required. A cable entry device comprising a sealing body according to the present disclosure can thus be composed of less parts than certain traditional cable entry devices.

Also the base of the sealing body may be elastically deformable. The entire sealing body according to the present disclosure may be elastically deformable. In the context of this disclosure, a body is considered elastically deformable if, after moderate deformation, it strives to return to its original shape once the deforming force is removed. The sealing body, the segmented wall and/or the base may be made from, or comprise, one or more elastomeric materials, e.g. a polymeric elastomeric material, such as rubber or nitrile butadiene rubber ("NBR"). An elastically deformable sealing body may generally provide better sealing. It may also be usable repeatedly, for example for sealing cables of different diameters or after inspection of a port entry device.

Preferably, in particular for ease of manufacturing, the base and the segmented wall—and potential further segmented walls—of the sealing body are made from the same material. However, it may be advantageous that the material of segmented wall is different from the material of the base. The material of a segmented wall may, for example, be softer, or more conformable, than the material of the base. This may ensure better sealing performance. The base and the segmented wall may be formed by molding. They may be co-molded.

Independent of the materials and the process used for forming the base and the segmented wall(s), the base and the segmented tubular wall(s) may be formed as a single piece. Two elements are referred to as being formed as a single piece if none of these elements ever existed separately from the other. The entire sealing body, which may comprise further elements other than the base and the segmented wall, may be formed as a single piece. Forming as a single piece is advantageous, because it avoids the presence of an interface between elements, through which moisture, dust or water vapour may enter the closure.

The passageway or any or each passageway of a sealing body according to the present disclosure may extend through the entire sealing body. It may extend between a first end portion and an opposed second end portion of the sealing body. Where the sealing body is rotationally symmetric, or portions of the sealing body are rotationally symmetric about a central axis, or the segmented wall is rotationally symmetric about a central axis, the passageway may be arranged along the central axis. Such a passageway may be referred to as a central passageway.

A passageway will generally be wide enough to accommodate a cable easily before the sealing body is radially compressed to seal the gap between the cable and a surface of the port entry device. Ideally, in an uncompressed state of the sealing body, a passageway may be just slightly wider than the cable, so that the cable can be accommodated in it easily.

In one aspect of this disclosure, a passageway in the sealing body has a cross section that corresponds to the cross section of the cable that it is supposed to receive. Many telecommunication cables have a circular cross section, hence in certain embodiments, the passageway has a circular cross section. A passageway may have a circular cross section and the same diameter along its entire length, hence a passageway may be a cylindrical passageway. Alternatively, the passageway may have a circular cross section over a fraction of its length.

Telecommunication cables can have flat cross sections or cross sections in the shape of a figure "8". Hence, in certain other embodiments the passageway has a flat cross section or a cross section in the shape of a figure "8". The passageway may have such a cross section over a fraction of its length or over its entire length.

The passageway comprises two axial portions: its first portion is formed by the base, its second portion is formed by the segmented tubular wall. The base thus comprises material that surrounds the first portion of the passageway and forms the delimiting wall of the first portion of the passageway. Similarly, the segmented wall comprises material that surrounds the second portion of the passageway and forms the delimiting wall, which is segmented, of the second portion of the passageway. The first axial portion and the second axial portion are adjacent to each other, i.e. they are not separated by a further axial portion. The first axial portion and the second axial portion may have the same cross section. Where the passageway is cylindrical, the first and the second portion may have the same diameter.

The passageway may have an symmetrical cross section, e.g. a rotationally symmetrical cross section or a mirror symmetrical cross section. A symmetry axis of a rotationally symmetrical cross section may define a passageway axis. The second portion of the passageway may be coaxial with the first portion of the passageway. The passageway axis of the second portion may be an extension of the passageway axis of the first portion.

Independent of its cross section, the passageway may be straight, i.e. straight in its length direction. The length direction of the passageway defines axial directions of the sealing body. Radial directions are directions orthogonal to the axial directions.

The segmented wall has a tubular shape: It has an inner surface, i.e. a radially inner surface, delimiting the second portion of the passageway. The segmented wall has an outer surface, i.e. a radially outer surface.

The radially inner surface of the segmented wall may form the second axial section of the passageway. In other words, the second axial section of the passageway may be delimited by the radially inner surface of the segmented wall.

Along its circumference, the segmented wall is subdivided into segments forming the segmented wall. The segmented wall may thus be formed by circumferentially arranged segments. Each segment may extend along a fraction of the circumference of the segmented wall. The circumferentially arranged segments may protrude from the base in an axial direction.

The inner surface of the segmented wall may be formed by surfaces of the segments. The outer surface of the segmented wall may be formed by surfaces of the segments.

A segment, a plurality of segments or all segments of a segmented wall may have an elongate shape. An elongate segment may comprise a first end portion and an opposed second end portion. The first end portion may be attached to the base, and/or may be arranged adjacent to the base.

Where the (first or second or any) segmented tubular wall is formed by circumferentially arranged segments protruding from the base in an axial direction, the segments may be separated by a plurality of gaps, extending between an inner surface of the segmented wall and an outer surface of the segmented wall. The gaps may help enable relative movement of adjacent segments and facilitate deformation of segments upon radial compression of the segmented wall.

Gaps or cuts separating segments of a segmented wall may be evenly distributed around the circumference of the segmented wall. This may facilitate an even distribution of the sealing capability amongst segments and avoid compression "hot spots". Alternatively, gaps or cuts may be unevenly distributed around the circumference of the segmented wall.

Whatever their circumferential distribution, such gaps may have different profiles. In certain embodiments, gaps are delimited in circumferential directions by planar surfaces ("gap-delimiting planes") of the adjacent segments. The gap-delimiting planes may be parallel to each other. Where the gap-delimiting planes are parallel to each other, gaps are referred to as "planar" gaps. Alternatively, the gap-delimiting planes may intersect.

The gap-delimiting planes may intersect in a line that defines a purely radial direction. In this case the gaps have a profile similar to a "V" or to a truncated "V". These gaps may be narrower in portions axially closer to the base, and wider in portions axially further from the base. Such gaps may be referred to as "V-shaped gaps". Hence, the width of the gaps, measured circumferentially, may increase with increasing axial distance from the base. V-shaped gaps may be easier to manufacture, e.g. by molding, than planar gaps and may adapt more easily to different cable diameters, because the V-shape may allow for thicker cables to be sealed by portions of the segments axially closer to the base, while thinner cables may be sealed by portions of the segments axially further from the base. Also, a sealing element having V-shaped gaps may be easier to remove from the mold after molding.

The gap-delimiting planes may intersect in a line that defines a purely radial direction and passes through the central axis of the passageway. In this case, the gaps have a profile similar to a "V" or to a truncated "V" and are oriented towards the central axis of the passageway. Such gaps may be referred to as "centered V-shaped" gaps.

The gap-delimiting planes may intersect in a line that is a purely radial direction and does not pass through the central axis of the passageway. In this case, the gaps have a shape similar to a "V" or to a truncated "V" and are oriented off the central axis. Such gaps may be referred to as "skew V-shaped" gaps. Such gaps may facilitate sliding of a surface of one segment over a surface of an adjacent segment under torsion, e.g. when a compression nut is turned to exert radial pressure on the segmented wall.

The gap-delimiting planes may intersect in a line that has a radial component and an axial component. In this case, the gaps have a V-shape when viewed in side view, and also get narrower or wider with varying radial distance from the central axis of the passageway. Such gaps may be referred to as "double V-shaped" gaps. Where the intersecting line does not pass through the central axis of the passageway, the gaps are "skew double V-shaped" gaps.

The gap-delimiting planes may intersect in a line that has no radial component, but only an axial component, in this case, the gaps have a V-shape when viewed in axial view, and get narrower or wider with varying radial distance from the central axis of the passageway, while their width remains constant with increasing axial distance from the base. Such gaps may be referred to as "wedge-shaped" gaps. Where none of the two gap-delimiting planes passes through the central axis of the passageway, the gaps may be called "skew wedge-shaped" gaps.

In a sealing body according to the present disclosure, one or several or all of the gaps separating the segments of a segmented wall may be planar. One or several or all of the gaps separating the segments of a segmented wall may be V-shaped, the gaps (60, 61) are V-shaped gaps.

The gaps or one or several or all of the gaps separating the segments of a segmented wall may be skew V-shaped gaps.

Skew V-shaped gaps may provide better sealing than centred V-shaped gaps, because upon distortion through a compression nut the gap-delimiting surfaces of adjacent segments may slide over each other more easily. This, in turn, may facilitate conformability of the segmented wall to the cable surface.

Where gaps are planar, the distance between the gap-delimiting planes may be the width of the gap between two adjacent segments. The planar gaps may have a width of between 0.01 mm and 1.0 mm or even 2.0 mm.

In certain embodiments, the segments of a segmented wall are separated by a plurality of V-shaped gaps, extending between an inner surface and an outer surface of the segmented wall, evenly distributed around the circumference of the segmented wall.

Alternatively, a segmented wall may be subdivided into segments by planar cuts. A planar cut refers to a cut in a geometric plane. Planar cuts provide for a distance of zero between adjacent segments of a segmented wall.

Any or all of the gaps or cuts subdividing a segmented wall may extend between the inner surface and the outer surface of the segmented wall. A tubular segmented wall may be subdivided into segments, for example, by four, six, eight, ten, twelve, sixteen, twenty or more gaps or cuts.

In certain embodiments the gaps of a segmented wall may extend between a radially inner surface and a radially outer surface of the segmented wall. In those embodiments, the gaps may form an open path between the outer surface and the inner surface before the sealing body is radially compressed. When compressed, adjacent segments will be urged towards each other both in radial and circumferential directions, which results in closing of the gaps and sealing.

In certain other embodiments, adjacent segments of a segmented wall (e.g. the first, the second, the third, the fourth or any segmented wall) are connected at their radially inner surfaces by a membrane. In certain of these embodiments, all segments of a segmented wall are connected at their radially inner surfaces by a membrane which extends along the full circumference of the inner surface of the segmented wall. The membrane may thrill a thin-walled cylinder, coaxial with the passageway, connecting the inner surfaces of adjacent segments of a segmented wall.

The membrane may form a thin-walled cylinder delimiting the passageway in radial directions. In those embodiments, the gaps extend radially inward from the radially outer surface of the segmented wall, when the sealing body is not compressed. The membrane further reduces the risk of ingress of moisture from the outer surface of the segmented wall through the gaps to the inner surface of the segmented wall and to the cable in the passageway, both when the sealing body is compressed and when it is not compressed.

Hence, the sealing body may further comprise a membrane connecting adjacent segments with each other at the inner surface of the segmented wall. The membrane may extend along the full circumference of the inner surface.

The thickness of the membrane is small, compared to the thickness of the segmented wall. The membrane may have a thickness of between 0.1 mm and 2 mm, for example, of 0.2 mm. A membrane thinner than 0.1 mm may be too fragile to reliably withstand the mechanical forces when the segmented wall is compressed radially. Generally, the thickness may be less than 10% of the thickness of the segmented wall in the axial position where the segmented wall touches the base. The thickness of the segmented wall in an axial position is the difference between its outer and its inner diameter in that axial position. In certain embodiments, the thickness of the membrane may be less than 5%, less than 2%, less than 1% or even less than 0.1% of the thickness of the segmented wall in the axial position where the segmented wall touches the base.

In axial directions, the membrane may extend from the base. In certain embodiments, the membrane extends axially as far as the segments extend axially, i.e. for the full length of the segments. In certain other embodiments, the membrane extends axially for 50% or less of the length of the segments.

A radially outer surface of the segmented wall, or generally of a segmented wall, may have a circular cross section. It may have a circular cross section at each axial position of the segmented wall. In an axial position, a segmented wall may thus have an outer diameter, defined by the diameter of its outer surface in that axial position. The outer diameter of a segmented wall may decrease, e.g. decrease linearly, with increasing axial distance from the base. Where the outer diameter of a segmented wall decreases linearly with increasing axial distance from the base, the radially outer surface of the segmented wall may have the shape of a frustrated cone. Hence, a segmented waft may have the outer shape of a frustrated cone. A segmented wall may thus have an outer surface in the shape of a frustrated cone.

Segmented walls having such shapes may be particularly easy to compress radially, e.g. by threading a nut over it that has an inner surface comprising a curved or conical portion.

The segmented wall is elastically deformable. In an uncompressed state, the segmented wall may not be in intimate contact with the cable in the passageway, but be radially spaced from the cable by a certain distance. By elastic deformation, e.g. by compression and/or torsion, the segmented waft may be brought in intimate contact with the cable and perform the sealing. The segmentation of the segmented wall allows for greater, more flexible deformation of this portion of the sealing body, and better conformability of the wall to the surface of the cable, when the sealing body is appropriately compressed. This may result in a better, more effective sealing of a gap between the cable and a surface of the port entry device comprising the sealing body.

The segmented wall may comprise, or be formed by, circumferentially arranged segments. Each segment may be elastically deformable. Where a segment is elongate and protrudes from the base, its first end portion may be anchored in the base. A segment may be bendable relative to the base, similar to a branch being bendable relative to the trunk of a tree. A segment may be bendable radially inwards, e.g. by radial compression, towards the passageway, such that its second end portion can contact the cable in the passageway. The segment may be bendable "sideways", i.e. in circumferential directions, such that its second end portion can follow a torsional force and contact the cable at a different circumferential position than the circumferential position of its first end portion.

A segment, or all segments, of the segmented wall may be elastically deformable in radial direction, e.g. it/they may be radially compressible. Under radial compression, a segment may become thinner in radial directions, and expand in circumferential directions. This circumferential expansion of adjacent segments under radial compression may reduce or close the gap between adjacent segments and thereby contribute to efficient sealing.

Radial compression of the sealing body in a port entry device may be effected by a compression nut having an inner thread and an inner compression surface comprising a curved or conically-shaped portion. When tightening the compression nut by turning it on a thread, its compression surface exerts pressure on the segmented wall. Due to the conically-shaped or curved portion of the compression surface, this pressure has a considerable radial component which compresses the segmented wall radially, towards the cable accommodated in the passageway. At the same time, the turning of the compression nut exposes the outer surface of the segmented wall to circumferential pressure. In certain sealing bodies according to the present disclosure, the segments of a segmented wall can be deformed by the circumferential pressure so that portions of the gaps eventually close and contribute to a better sealing.

For better sealing performance, a sealing body according to the present disclosure may comprise two segmented walls, protruding from the same base in opposite axial directions. In embodiments in which the (first) segmented tubular wall is formed by circumferentially arranged segments protruding from the base in an axial direction, the sealing body may thus further comprise a second segmented tubular wall, elastically deformable and radially compressible, forming a third axial portion of the passageway, the second segmented tubular wall being formed by circumferentially arranged segments protruding from the base in a direction opposite to the axial direction in which the segments of the first segmented wall protrude. The third axial portion of the passageway may be coaxial with, and adjacent to, the first axial portion.

As described above for the first segmented wall, the segments of the second segmented wall may be separated by a plurality of gaps, extending between an inner surface of the second segmented wall ad an outer surface of the second segmented wall. In certain embodiments, gaps of the second segmented wall are delimited in circumferential directions by planar surfaces ("gap-delimiting planes") of the adjacent segments. The gap-delimiting planes may be parallel to each other. Where the gap-delimiting planes are parallel to each other, gaps are referred to as "planar" gaps. Alternatively, the gap-delimiting planes may intersect.

The gaps in the second segmented wall may have any of the shapes such as those described above for the first segmented wall. The gaps in the second segmented wall may, for example, be V-shaped, centered V-shaped, skew V-shaped, double V-shaped or skew wedge-shaped.

Where an uncut fibre-optic cable is to enter and exit the closure in a sealed manner, or where two cables are to enter the closure, it may be convenient to have a port entry device with a single sealing body providing two passageways: a first passageway for a first cable entering the closure, and a second parallel passageway for a second cable entering the closure, or—for an uncut cable—a first passageway for the uncut cable entering the closure, and a second passageway for the uncut cable exiting the closure. The second passageway may be parallel to the first passageway. This may save space and allow for the sealing body to be smaller.

In a sealing body according to the present disclosure, also the second passageway may have two axial portions: a first axial portion formed by the base, and an adjacent second axial portion, coaxial with the first portion and formed by a second segmented tubular wall. Generally, the second segmented tubular wall may have the same properties as the first segmented wall, i.e. it may be elastically deformable and radially compressible, and it may be formed by circumferentially arranged segments protruding from the base in an axial direction, where the segments may or may not be separated by a plurality of planar gaps extending between an inner surface of the second segmented wall and an outer surface of the second segmented wall. In such a sealing body, the one base forms the respective first portions of both passageways, while two different segmented walls form the respective second portions of the passageways.

So generally, a sealing body according to the present disclosure may further comprise a second passageway for receiving a section of the cable or of a second cable, the length direction of the second passageway extending parallel to the length direction of the first passageway, the second passageway comprising a first axial portion and an adjacent, coaxial second axial portion, wherein the base forms the first axial portion of the second passageway, and wherein the sealing body further comprises a second segmented tubular wall, elastically deformable and radially compressible, forming the second axial portion of the second passageway.

Certain sealing bodies according to this disclosure, comprising two parallel passageways, cannot be compressed by turning a single threaded compression nut over a thread. Also, certain other sealing bodies may advantageously be compressed by compression devices other than threaded compression nuts. Port entry devices comprising such sealing bodies may therefore be equipped with a different compression mechanism. A port entry device may, for example, comprise two flanges, axially spaced from each other, between which the sealing body can be arranged. Each flange may have a through-hole for receiving a cable section. One flange or each flange may have a receptacle for receiving a (first or second) segmented wall of the sealing body. The receptacle may have an inner surface comprising a curved or conical portion to compress the segmented wall. A curved portion of an inner surface, in this context, refers to a surface that exhibits, in at least a portion of it, a curvature as viewed in an axial, i.e. longitudinal, section of a port entry device. A conical portion of an inner surface, as opposed to that, is a portion of the inner surface which is drawn as an inclined, but straight line in an axial section.

The two flanges of the port entry device may be urged linearly, in an axial direction, towards each other, whereby the sealing body is compressed axially between them, and the segmented tubular wall(s) is/are compressed radially by the inner surface of the receptacle around the cable for sealing. Also the base may be compressed for sealing. The two flanges of the port entry device may be urged in an axial direction towards each other by tightening one or more screws that engage with both flanges.

So generally, the present disclosure also provides a port entry device comprising a sealing body as described herein, and two flanges, arranged and adapted for compressing the sealing body axially between them. In certain embodiments, the flanges may be arranged and adapted for compressing the sealing body axially between them and for compressing a segmented wall, such as the first segmented wall or the second segmented wall, radially around the cable.

An uncut cable has no end that could be threaded through a passageway of the sealing body. Hence where a sealing body according to this disclosure comprises two passageways for sealed entrance and exit of an uncut cable, it may be advantageous to provide the sealing body with a slit which allows to separate, completely or at least partially, two portions of the sealing body from each other, so that the passageways can be opened and become accessible, and sections of the uncut cable can be arranged in the passageways.

Such a slit may separate the sealing body into two separate, unconnected portions, so that the sealing body comprises two unconnected portions. Alternatively, such a slit may separate the sealing body into two portions that are connected with each other by a third portion of the sealing body. The third portion may form a hinge portion such as a "living hinge".

The slit may be planar, i.e. it may lie in a geometric plane, the plane of the slit. The plane of the slit may be defined by a length direction of the first passageway and a length direction of the second passageway. Alternatively, the plane of the slit may be defined by a central axis of the first passageway and a central axis of the second passageway.

So in certain embodiments a sealing body comprising two passageways as described above may further comprise a planar slit through the sealing body, the slit lying in a geometric plane defined by the length direction of the first passageway and the length direction of the second passageway, such that the slit allows an at least partial separation of two portions of the sealing body for arranging sections of cables in the first and second passageways.

This disclosure also provides a port entry device for telecommunication cables, comprising a) a sealing body as described herein, and b) a compression element, comprising a curved or conical portion of an inner surface for radially compressing the segmented wall around a cable in the passageway.

The present disclosure further provides a kit of parts comprising a) a closure for accommodating elements of a communication network, having a port for allowing entry of a telecommunication cable of the communication network into the closure, and b) a port entry device as described herein, engageable with the port, for sealed entry of the cable into the closure.

The present disclosure also provides a communication network comprising a) a communication cable, b) a closure for accommodating elements of the communication network, having a port for allowing entry of the cable into the closure, and c) a port entry device as described herein, engaged with the port, for sealed entry of the cable into the closure.

BRIEF DESCRIPTION OF THE DRAWINGS

The invention will now be described in more detail with reference to the following Figures exemplifying particular embodiments of the invention, wherein like reference numbers indicate like elements.

DETAILED DESCRIPTION

Figure 1:
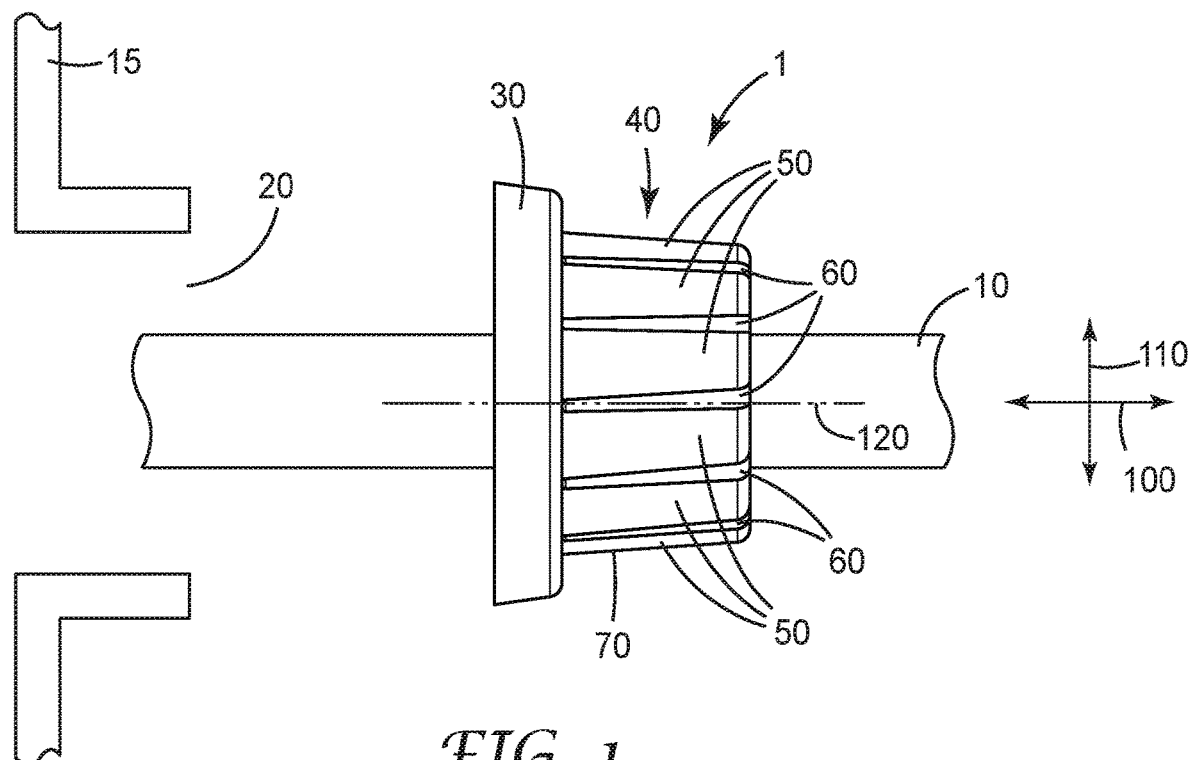
FIG. 1 Radial view of a first sealing body according to the present disclosure.

A first sealing body 1 according to the present disclosure is illustrated in a radial view, a side view, in FIG. 1. It is arranged on a communication cable 10 that is entering a closure 15 at a port 20 of the closure 15. The first sealing body 1 is comprised in a port entry device, of which other elements are not shown. The first sealing body 1 comprises a base 30 and a segmented tubular wall 40. The base 30 and the segmented wall 40 are formed as a single piece.

A passageway in the sealing body 1, which is not visible in FIG. 1, receives a section of the cable 10. Its length direction defines axial directions, indicated by arrow 100, and radial directions indicated by arrow 110, orthogonal to the axial directions 100. The passageway has a cylindrical shape, thereby defining a central axis 120 of the passageway. A first axial portion of the passageway is formed by the base 30, a second portion, adjacent to the first portion and coaxial with it, is formed by the segmented tubular wall 40. The entire sealing body 1 is rotationally symmetric with respect to this central axis 120.

The base 30 is not subdivided, i.e. it is continuous. The segmented wall 40, however, is formed by twelve circumferentially arranged segments 50, arranged circumferentially around the second axial portion of the passageway. Each of the segments 50 protrudes from the base 30 in one axial direction 100, namely towards the right in FIG. 1. The segments 50 are made of nitrile butadiene rubber, just as the base 30 and the entire sealing body 1. They are elastically deformable and radially compressible, so that the entire segmented tubular wall 40 is elastically to deformable and radially compressible.

The segments 50 are separated by skew V-shaped gaps 60, each of which extends between an inner surface, i.e. a radially inner surface, of the segmented wall 40 and an outer surface 70, i.e. a radially outer surface 70, of the segmented wall 40. The term "outer surface" refers to the radially outer surface of the segmented wall 40 if the gaps 60 were infinitely narrow. The gaps 60 become wider with increasing axial distance from the base 30.

The gaps 60 are evenly distributed around the circumference of the segmented wall 40. All gaps 60 have an identical profile.

Each gap 60 separates a gap-delimiting surface of a segment 50 from an opposite gap-delimiting surface of an adjacent segment 50. In the sealing body 1, the gap-delimiting surfaces are geometric planes, the "gap-delimiting planes". These two gap-delimiting planes intersect in a line that has a radial component and no axial component. Therefore the gaps 60 have a V-shape when viewed in side view as in FIG. 1, and they increase in width circumferentially with increasing axial distance from the base 40. The gaps 60 do not get wider with increasing radial distance from the central axis 120 of the passageway. Since the line of intersection of the gap-delimiting planes does not pass through the central axis 120 of the passageway, the gaps 60 are skew V-shaped gaps 60.

The segmented wall 40 has an annular cross section, when disregarding the comparatively small gaps 60. The outer surface 70 of the segmented wall 40 has a circular cross section in all positions along the axial direction 100 of the segmented wall 40. The outer surface 70 of the segmented wall 40 has a slightly conical outer shape, because its radially outer diameter is larger next to the base 30 than axially further from the base. The outer diameter of the segmented wall 40 thus decreases with increasing axial distance from the base 30.

The segmented wall 40 can be radially compressed by a compression nut (not shown) which may be comprised in, or engage with, a port entry device containing the first sealing body 1. When the compression nut is tightened, it urges the segments 50 radially against the surface of the cable 10, and, when tightened further, compresses the segments 50 which expand circumferentially, seal the gaps 60 and provide sealing between the surface of the cable 10 and a surface of the port entry device.

Figure 2:
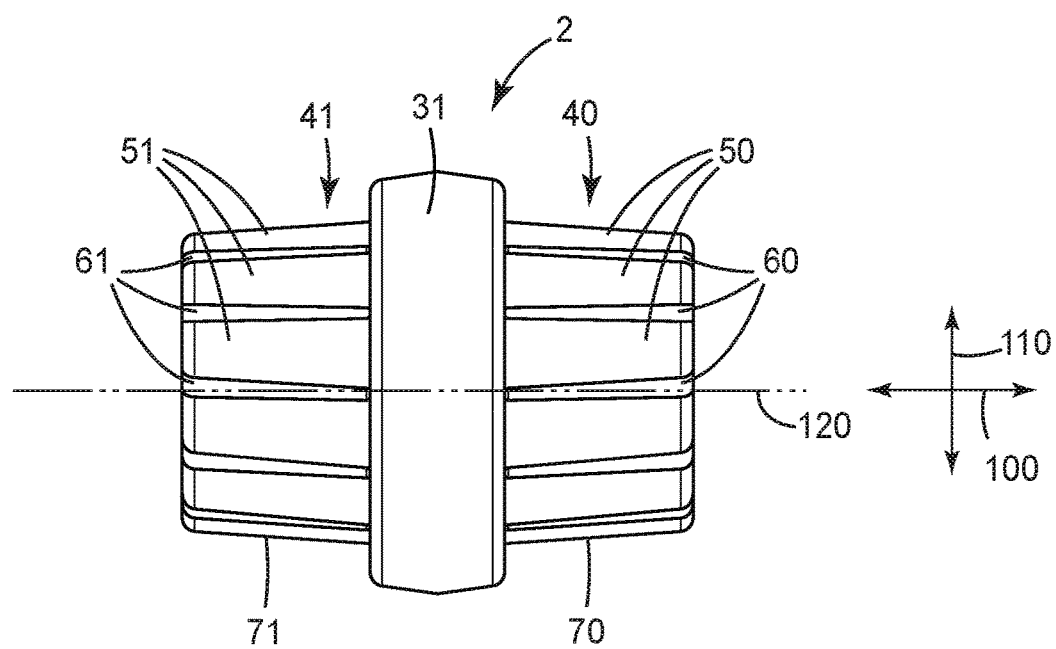
FIG. 2 Radial view of a second sealing body according to the present disclosure having two segmented walls.

In order to achieve even better sealing for a single cable, a sealing body according to the present disclosure may comprise two segmented walls. Such a sealing body (the "second sealing body") is illustrated in FIG. 2 in a side view. Its right-hand portion (as shown in FIG. 2) is to identical to the first sealing device 1 of FIG. 1. Its left-hand portion is a mirrored version of its right-hand portion.

Beyond the elements already explained in the context of the embodiment shown in FIG. 1, the second sealing body 2 comprises a base 31, larger than the base 30 of the first sealing body 1, and a second segmented tubular wall 41 forming a third axial portion of the passageway. Also the second segmented wall 41 is elastically deformable and radially compressible. The second segmented wall 41 is formed by circumferentially arranged segments 51 protruding from the base 31 in an axial direction 100, namely towards the left in FIG. 2, opposite to the axial direction 100 in which the segments 50 of the first segmented wall 40 protrude.

The base 31 is continuous. Similar to the first segmented wall 40, the second segmented wall 41 is formed by twelve circumferentially arranged segments 51, arranged circumferentially around a third axial portion of the passageway. The segments 50, 51 of the segmented walls 40, 41, the base 31 and the entire second sealing body 2 are made of nitrile butadiene rubber.

The segments 51 of the second segmented wall 41 are separated by skew V-shaped gaps 61, each of which extends between an inner surface and an outer surface 71 of the segmented wall 41. The shape of these gaps 61 is identical to the shape of the gaps 60 of the first segmented wall 40, and identical to the shape of the gaps 60 of the first sealing body 1. The gaps 60, 61 are evenly distributed around the circumference of the respective segmented walls 40, 41.

A cable 10 entering a closure 15 through a port entry device comprising the second sealing body 2 is sealed in at least two axial locations, namely by the first segmented wall 40 and by the second segmented wall 41. The sealing is therefore potentially more effective than sealing by a single segmented wall 40.

Where two cables 10 are to sealingly enter a closure 15 via a port entry device, or where a loop of an uncut cable is to sealingly enter and exit a closure 15 via a port entry device, a sealing body according to the present disclosure can comprise two parallel passageways, each sealed by two segmented walls as explained in the second sealing body 2.

Figure 3:
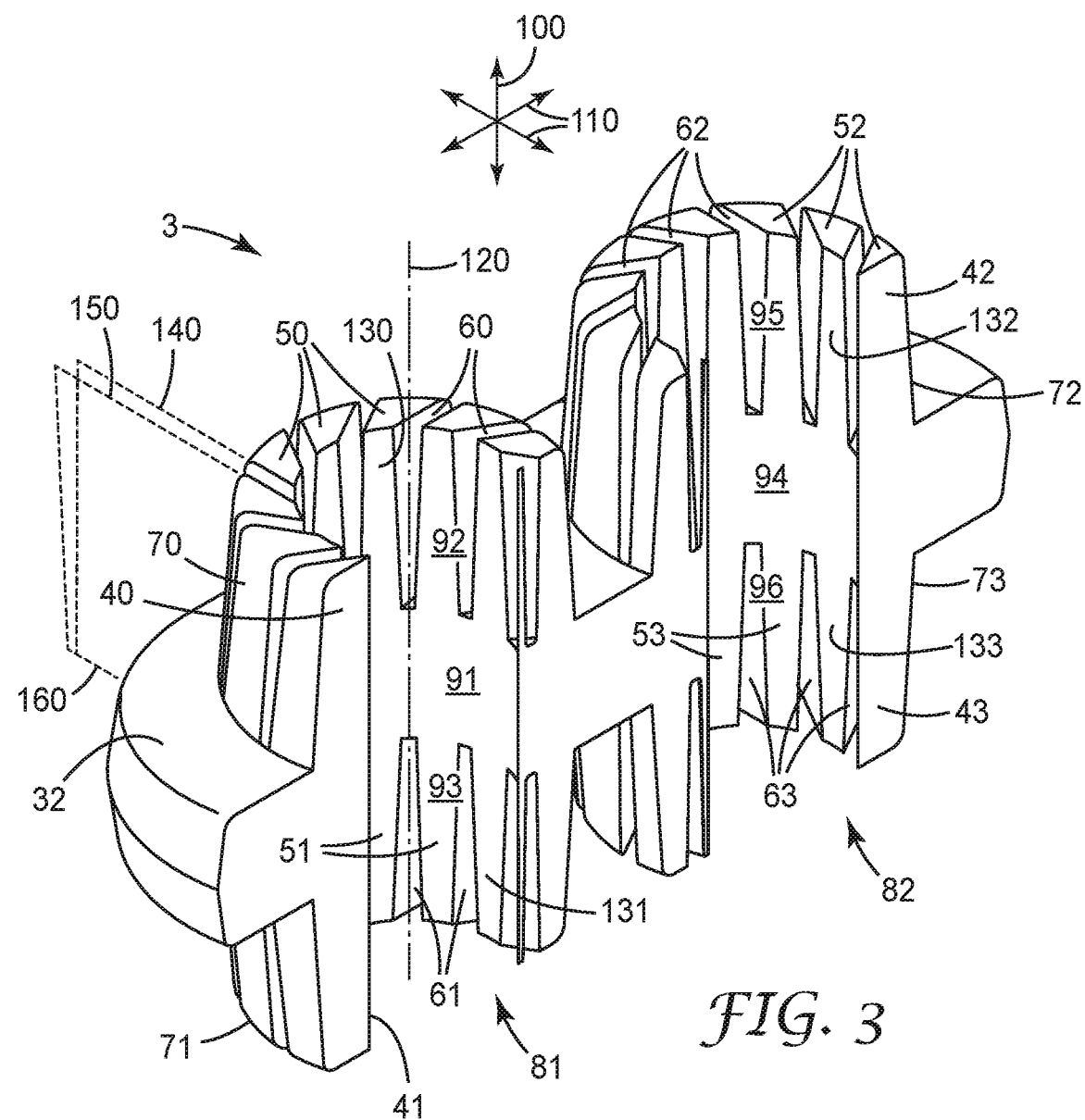
FIG. 3 Perspective sectional view of a third sealing body according to the present disclosure.

This is illustrated in FIG. 3 in a perspective sectional view, which shows a third sealing body 3 for facilitating sealed entry of two cables through a port entry device into a closure 15. The third sealing body 3 can be thought of as a combination of two sealing bodies 2 shown in FIG. 2 with a common base.

The third sealing body 3 comprises a first passageway 81 of cylindrical shape for receiving to a first cable. The first passageway 81 has a first axial portion 91 formed by a base 32, an adjacent second axial portion 92, coaxial with the first axial portion 91 and formed by a first segmented tubular wall 40, and a third axial portion 93, adjacent to the first axial portion 91 and coaxial with it, formed by a second segmented tubular wall 41.

The length direction of the first passageway 81 defines axial directions 100. Radial directions 110 are orthogonal to the axial directions 100.

The first segmented wall 40 is formed by circumferentially arranged segments 50 which all have the same length and protrude from the base 32 in one axial direction 100, namely upwards in FIG. 3. The segments 50 are separated by a plurality of gaps 60, which subdivide the first segmented wall 40 and extend between an inner surface 130 and an outer surface 70 of the segmented wall 40. The gaps 60 are evenly distributed around the circumference of the first segmented wall 40.

The profile of the gaps 60 is skew V-shaped, i.e. the width of the gaps 60 increases with increasing axial distance from the base 32. As is illustrated for one gap 60, each of the gaps 60 is delimited in circumferential direction by two geometric planes, the "gap-delimiting planes". A first gap-delimiting plane 140 and a second gap-delimiting plane 150 intersect at a line 160 which has only a radial component 110. The shape of the gaps 60 can thus be referred to as V-shaped. More particularly, the gaps 60 can be referred to as skew V-shaped gaps 60, because the space between the gap-delimiting planes 140, 150 does not comprise the central axis 120.

The first segmented wall 40 has an overall conical shape, that is to say, its outer surface 70 has a circular cross section at any axial position, and the outer diameter of the first segmented wall 40 decreases with increasing axial distance from the base 32.

The third axial portion 93 of the first passageway 81 is formed by a second segmented tubular wall 41 as explained for the second segmented wall 41 of the second sealing body 2 in FIG. 2. Also the second segmented wall 41 is elastically deformable and radially compressible, it is formed by circumferentially arranged segments 51 protruding from the base 32 in an axial direction 100 opposite to the axial direction 100 in which the segments 50 of the first segmented wall 40 protrude.

The third sealing body 3 further comprises a second passageway 82 of cylindrical shape for receiving a second cable. The second passageway 82 extends lengthwise parallel to the length direction of the first passageway 81, both passageways 81, 82 extend lengthwise in axial directions 100. The second passageway 82 has a first axial portion 94 formed by the base 32, an adjacent second axial portion 95, coaxial with the first axial portion 94, formed by a third segmented tubular wall 42, and a third axial portion 96, adjacent to the first axial portion 94 and coaxial with it, formed by a fourth segmented tubular wall 43.

The third segmented wall 42 is structurally identical to the first segmented wall 40 of the sealing body 3. In particular it is formed by circumferentially arranged segments 52 which all have the same length and protrude from the base 32 in one axial direction 100, upwards in FIG. 3. The segments 52 are separated by a plurality of evenly distributed skew V-shaped gaps 62, which subdivide the third segmented wall 42 and extend between an inner surface 132 and an outer surface 72 of the third segmented wall 42.

The third axial portion 96 of the second passageway 82 is formed by a fourth segmented tubular wall 43, which is structurally identical to the second segmented wall 41 of the sealing body 3. Also the fourth segmented wall 43 is elastically deformable and radially compressible, it is formed by circumferentially arranged segments 53 of identical axial length, protruding from the base 32 in an axial direction 100 (downwards in FIG. 3) opposite to the axial direction 100 in which the segments 52 of the third segmented wall 42 protrude. The segments 53 are separated by a plurality of evenly distributed, skew V-shaped gaps 63, which subdivide the fourth segmented wall 43 and extend between an inner surface 133 and an outer surface 73 of the fourth segmented wall 43.

Figure 4:
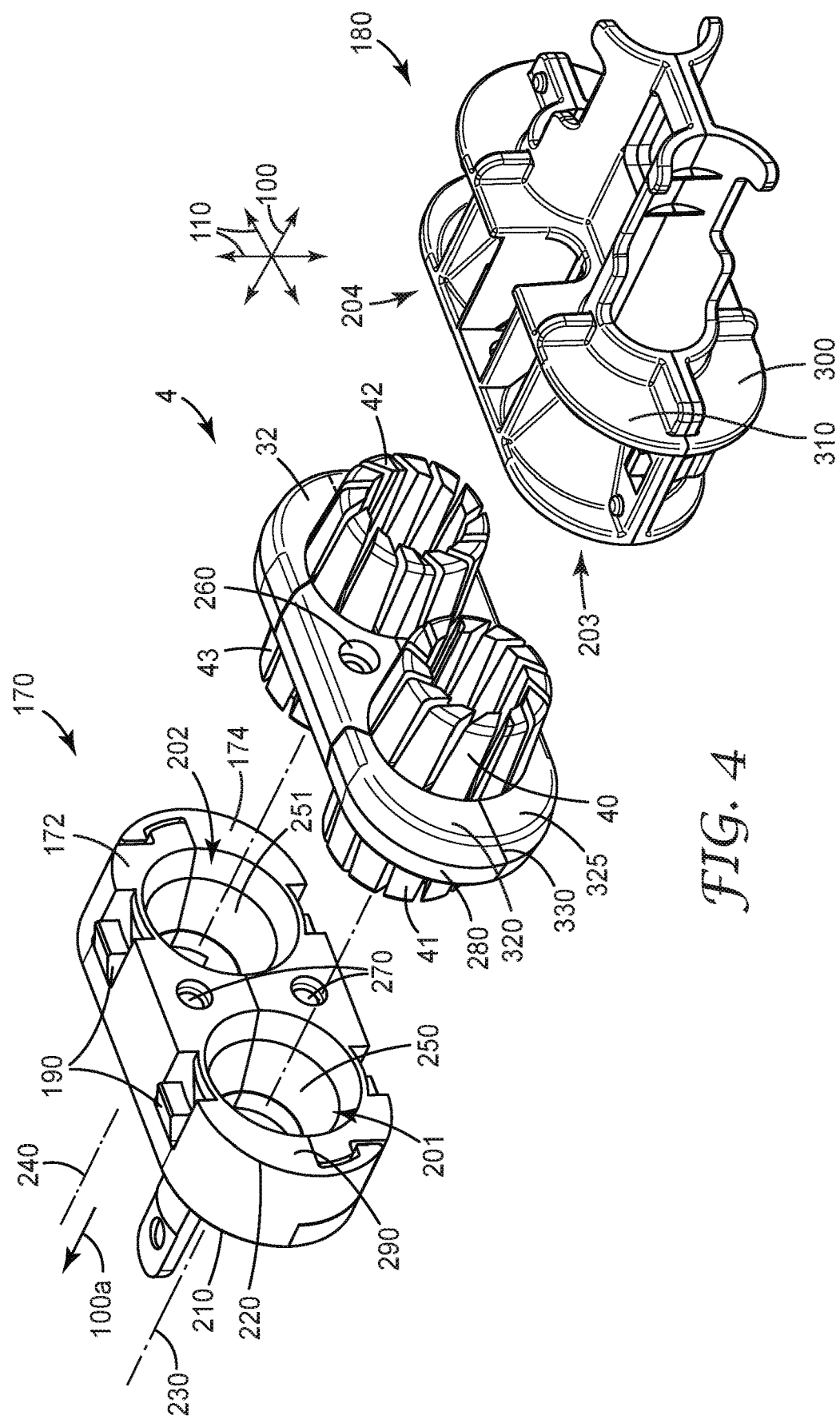
FIG. 4 Perspective view of a fourth sealing body according to the present disclosure and two flanges before assembly into a port entry device.

The perspective view of FIG. 4 illustrates, how a fourth sealing body 4 according to the present disclosure integrates with two flanges to form a port entry device for sealed entry of two cables into a closure 15. The fourth sealing body 4 is identical with the third sealing body 3, except that is adapted to receive two sections of an uncut cable, as will be explained below. It is shown as arranged before assembly of the port entry device, between a front flange 170 and a rear flange 180.

After assembly of the port entry device, the front flange 170 will be inserted first into the port 20 of a closure 15 in an insertion direction 100a, which is an axial direction 100 of the sealing body 3. The front flange 170 comprises latches 190 for fixation in the port 20 of the closure 15, and two identical compression funnels: A first compression funnel 201 for receiving and radially compressing the second tubular segmented wall 41, and a parallel, identical second compression funnel 202 for receiving and radially compressing the fourth tubular segmented wall 43.

The compression funnels 201, 202 extend parallel to each other in the insertion direction 100a between a front end portion 210 and a rear end portion 220 of the front flange 170. They to are rotationally symmetric about a first central axis 230 and a respective second central axis 240. The first compression funnel 201 has a compression surface 250, which is an inner surface of the front flange 170. The compression surface 250 has a conical shape, i.e. its diameter decreases linearly along the insertion direction 100a. Upon assembly of the port entry device, the sealing body 4 is compressed between the front flange 170 and the rear flange 180, so that the second segmented wall 41 is urged into the first compression funnel 201 in the insertion direction 100a. Due to its conical shape, the compression surface 250 compresses the elastically deformable second segmented wall 41 in radial directions 110 towards the central axis 120 of the first passageway 81 and upon the surface of a cable (not shown) in the first passageway 81. The deeper the second segmented wall 41 is urged into the first compression funnel 201, the greater the axial compression of the segmented wall 41 and the better the sealing provided by the segmented wall 41. The fourth sealing body 4 thereby seals a gap between the cable and the compression surface 250.

The second compression funnel 202 is structurally identical to the first compression funnel 201 and functions the same way. It has a conical surface 251, too, for radially compressing the fourth segmented wall 43 of the sealing body 4 when the fourth segmented wall 43 is urged into the second compression funnel 202.

For compression of the first segmented wall 40 and of the third segmented wall 42 of the sealing body 4, the rear flange 180 comprises two parallel compression funnels 203, 204 identical to the compression funnels 201, 202 in the front flange 170.

For compression of the sealing body 4, and for urging the second and the fourth segmented walls 41, 43 into the respective compression funnels 201, 202, and for urging the first and the third segmented walls 40, 42 into the respective compression funnels 203, 204 (not visible in FIG. 4) of the rear flange 180, this rear flange 180 is urged towards the front flange 170 by two screws (not shown) that pass through holes in the rear flange 180 and through holes 260 in the sealing body 4 and engage with threads 270 in the front flange 170. When tightening the screws, the base 32 is axially compressed between the flanges 170, 180 and expands in radial directions 110. Thereby, the outer edge 280 of the base 32 protrudes over the surfaces of the flanges 170, 180, and seals the port entry device against a surface of the port 20 into which the port entry device is inserted.

Where the fourth sealing body 4 is used to facilitate sealed entry and exit of an uncut cable into/from the closure 15, the front flange 170, the sealing body 4 and the rear flange 180 must be designed such as to allow to arrange sections of the cable in the respective passageways without to having to thread an end of the cable through closed openings. For that purpose, the front flange 170 is made of an upper portion 172 and a lower portion 174, identical in shape with the upper portion 172, that can be snap-fit to each other to form the front flange 170. For installing an uncut cable, a first section of the uncut cable is arranged in the first compression funnel 201 of the lower portion 174, a second section of the uncut cable is arranged in the second compression funnel 202 of the lower portion 174, and the upper portion 172 is connected to the lower portion 174 by snap-fit to form the front flange 170.

For the same purpose, the rear flange 180 comprises a lower portion 300 and an upper portion 310, identical in shape with the lower portion 300, that can be connected to each other. This connection is done by a snap-fit after arranging two sections of the uncut cable in the compression funnels 203, 204 of the rear flange 180.

The only difference between the third and the fourth sealing body is that the fourth sealing body 4 shown in FIG. 4 is adapted for use with an uncut cable. The fourth sealing body 4 is made of an upper portion 320 and a lower portion 325, separated by a separation plane defined by the length direction of the first passageway 81 and the length direction of the second passageway 82. The separation plane is indicated in FIG. 4 by a horizontal line. The horizontal line represents a planar slit 330, lying in the separation plane, through the sealing body 4, separating the upper portion 320 and the lower portion 325. This modified sealing body 4 thus consists of two completely separate portions 320, 325, that can be separated from each other to facilitate arranging sections of the uncut cable in its passageways 81, 82, and that are then brought into contact with each other as shown in FIG. 4 and held in sealing contact by the flanges 170, 180.

Alternatively, a modified sealing body could consist of two portions that are connected by a hinge, e.g. a living hinge, which facilitates pivoting of the upper portion 320 away from the lower portion 325 about a pivot axis extending in an axial direction. With the two portions pivoted apart, sections of the uncut cable can be arranged in the passageways 81, 82. The portions of the modified sealing body can then be pivoted together again to form the shape of the sealing body shown in FIG. 4. Once the port entry device is assembled, the modified sealing body is held in shape by the flanges 170, 180.

Figure 5:
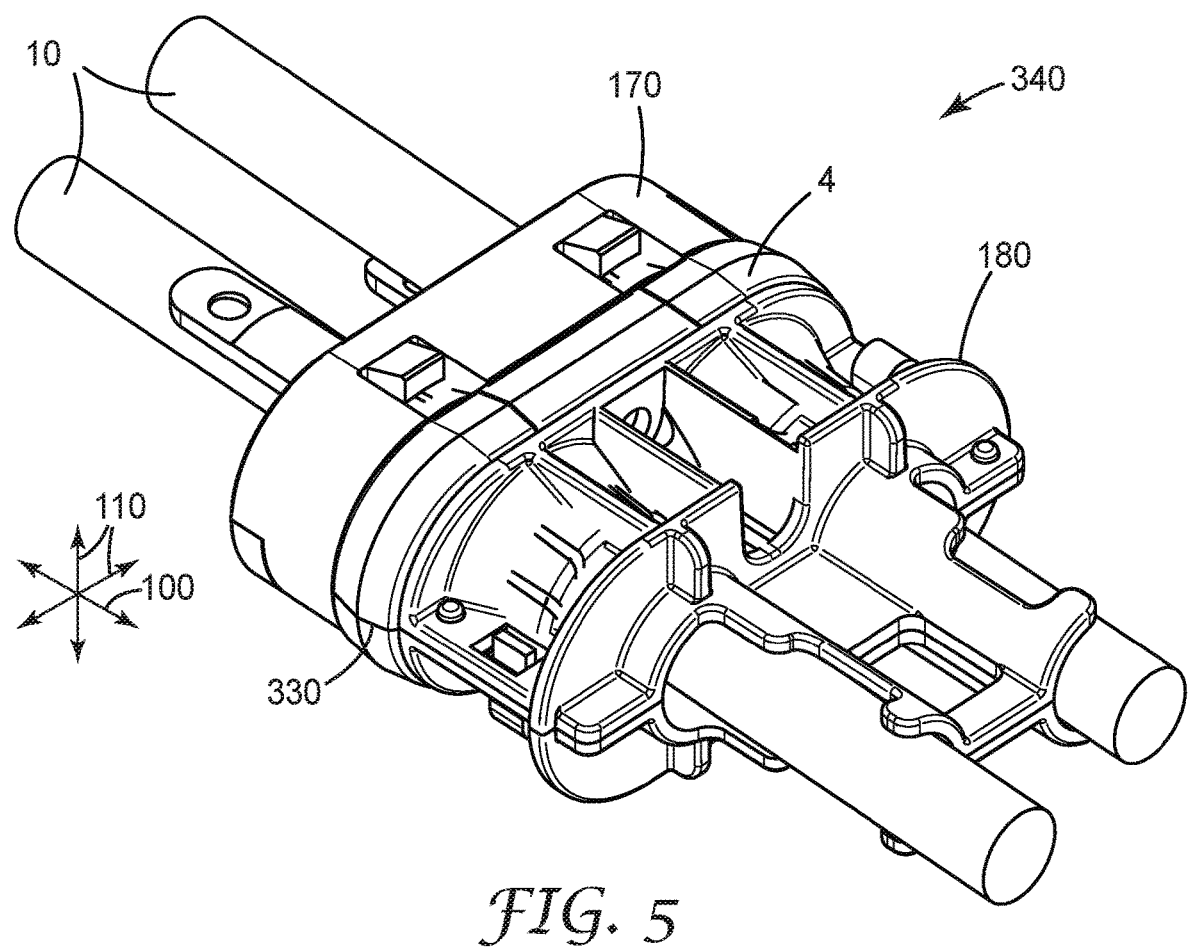
FIG. 5 Perspective view of a port entry device, assembled from the components shown in FIG. 4, and arranged on cables.

FIG. 5 illustrates, in perspective view, a port entry device 340 assembled from the fourth sealing body 4 and the flanges 170, 180 shown in FIG. 4, arranged on two cables 10 that are to sealingly enter a telecommunication closure 15 through a port 20 of the closure.

Figure 6:
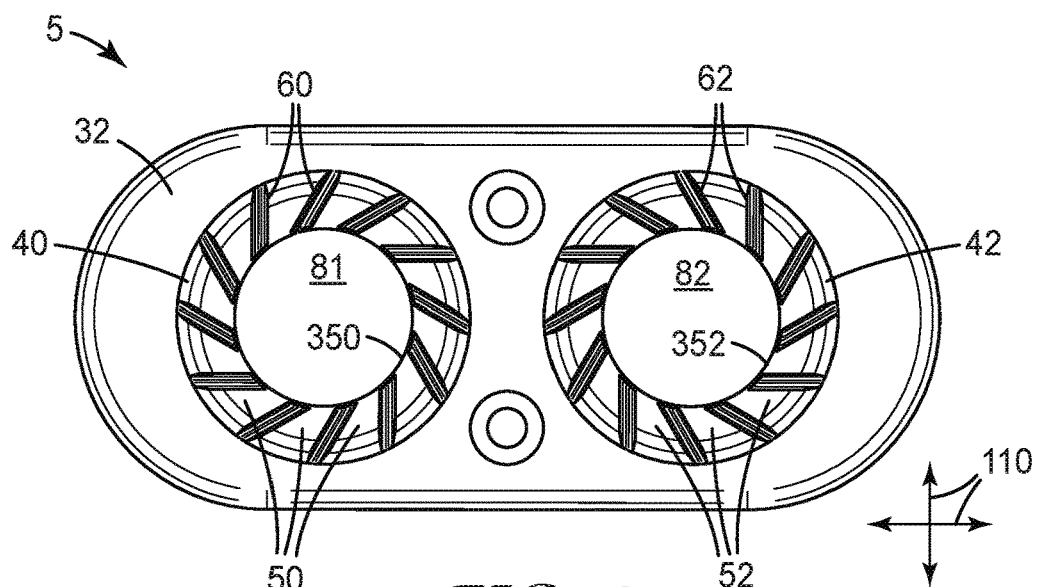
FIG. 6 Axial view of a fifth sealing body according to the present disclosure, comprising a membrane.

Certain sealing bodies according to the present disclosure comprise a thin skin or a membrane which delimits the passageway radially and connects adjacent segments of the segmented wall with each other at the inner surface of the segmented wall. FIG. 6 illustrates, in an axial view, such a sealing body: This fifth sealing body 5 is identical with the third sealing body 3 shown in FIG. 3, except that the passageway's 81, 82 are delimited by respective membranes 350, 352. The first membrane 350 delimits the first passageway 81 in radial directions 110 and connects adjacent segments 50 of the first segmented wall 40 with each other at the inner surface 130 of the first segmented wall 40. The membrane 350 extends along the full circumference of the inner surface 130. The gaps 60 thus do not extend radially up to the first passageway 81, but only up to the membrane 350. Ingress of moisture through the gaps 60 into the first passageway 81 is thus reduced or even avoided.

The first membrane 350 is formed as a single piece with the segments 50 and the base 32. It has a thickness of about 0.5 mm and is elastically deformable. Therefore, when the first segmented wall 40 is radially compressed, the membrane 350 follows the movement of the segments 50 and conforms to the surface of the cable in the first passageway 81.

The third segmented wall 42 is equipped with an identical, second membrane 352 which delimits the second passageway 82 in radial directions 110 and connects adjacent segments 52 of the third segmented wall 42 with each other at the inner surface 132 of the third segmented wall 42.

Figure 7:
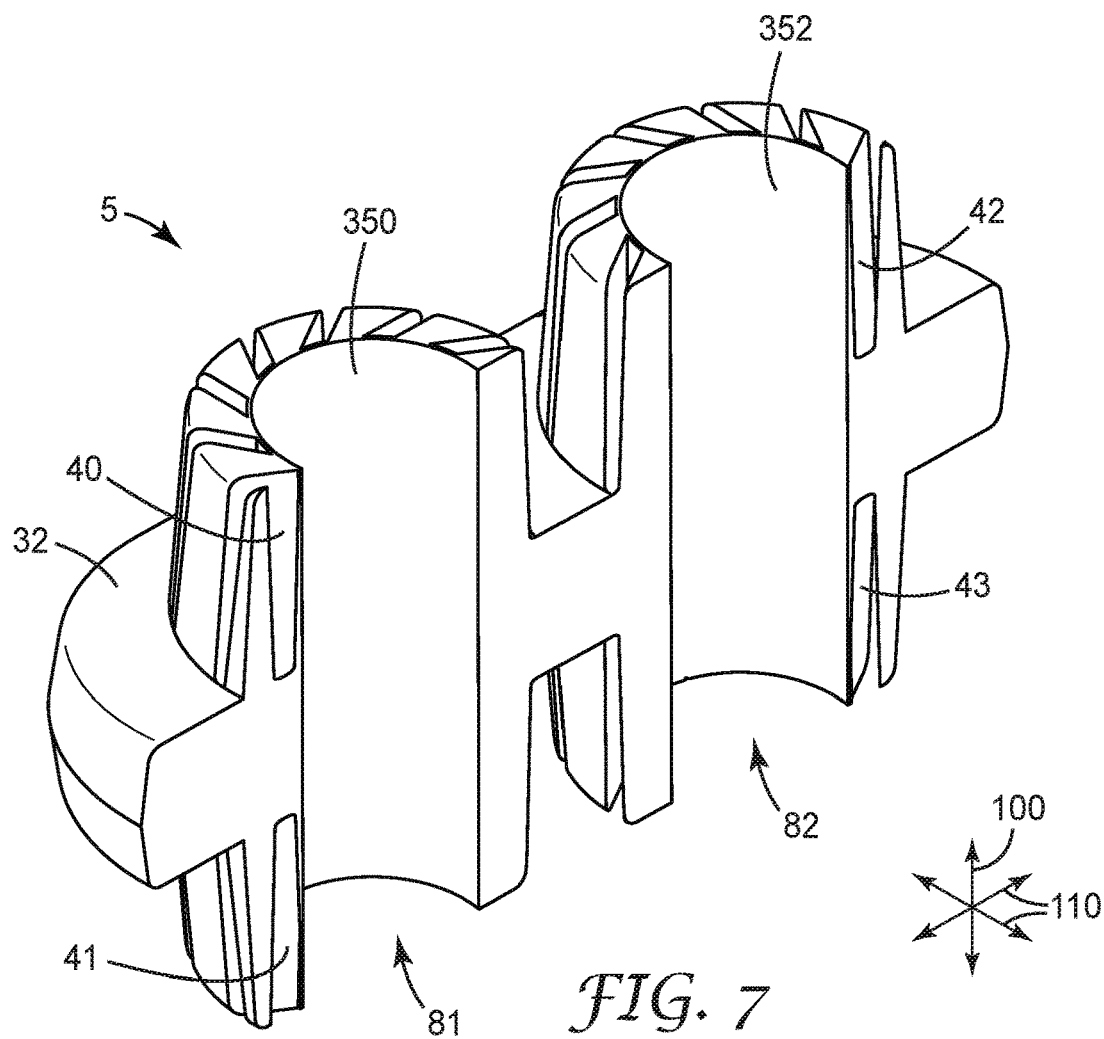
FIG. 7 Perspective sectional view of the fifth sealing body.

FIG. 7 illustrates, in a perspective view, the fifth sealing body 5 with the first membrane 350 and the second membrane 352 extending axially through, and delimiting radially, the entire respective first and second passageways 81, 82. The first membrane 350 thus also connects adjacent segments 51 of the second segmented wall 41 with each other at the inner surface 131 of the second segmented wall 41, and the second membrane 352 also connects adjacent segments 53 of the fourth segmented wall 43 with each other at the inner surface 133 of the fourth segmented wall 43.

The invention claimed is:

1. A sealing body for sealing a gap between a telecommunication cable and a surface of a port entry device, the sealing body comprising:
  a passageway for receiving a section of the telecommunication cable, comprising a first axial portion and an adjacent, coaxial second axial portion,
  wherein the length direction of the passageway defines axial directions, with radial directions being directions orthogonal to the axial directions,
  a base forming the first axial portion of the passageway, and
  a segmented tubular wall, comprising a plurality of circumferentially arranged segments such that the segmented tubular wall is elastically deformable, radially compressible and circumferentially expandable, forming the second axial portion of the passageway, wherein the second axial portion is adjacent to, coaxial, and formed with the first axial portion such that the sealing body is rotationally symmetric with respect to a central axis of the passageway
  wherein the plurality of circumferentially arranged segments are separated by a plurality of gaps, extending between an inner surface of the segmented wall and an outer surface of the segmented wall, and wherein the plurality of gaps form an open path between the outer surface and the inner surface before the sealing body is radially compressed.

2. The sealing body according to claim 1, wherein the plurality of circumferentially arranged segments each protrude from the base in an axial direction.

3. The sealing body according to claim 2, further comprising a second segmented tubular wall, elastically deformable and radially compressible, forming a third axial portion of the passageway, the second segmented tubular wall being formed by circumferentially arranged segments protruding from the base in a direction opposite to the axial direction in which the segments of the first segmented wall protrude.

4. The sealing body according to claim 1, further comprising a membrane connecting adjacent segments with each other at the inner surface of the segmented wall, the membrane extending along the full circumference of the inner surface.

5. The sealing body according to claim 1, wherein the width of the gaps, measured circumferentially, increases with increasing axial distance from the base.

6. The sealing body according to claim 1, wherein the gaps are V-shaped gaps.

7. The sealing body according to claim 1, wherein the base and the segmented tubular wall are formed as a single piece.

8. The sealing body according to claim 1, further comprising a second passageway, for receiving a section of the telecommunication cable or of a second cable, the length direction of the second passageway extending parallel to the length direction of the first passageway, the second passageway comprising a first axial portion and an adjacent, coaxial second axial portion,
  wherein the base forms the first axial portion of the second passageway, and wherein the sealing body further comprises a second segmented tubular wall, elastically deformable and radially compressible, forming the second axial portion of the second passageway.

9. The sealing body according to claim 8, comprising a planar slit through the sealing body, the slit lying in a geometric plane defined by the length direction of the first passageway and the length direction of the second passageway, such that the slit allows an at least partial separation of two portions of the sealing body for arranging sections of cables in the first and second passageway.

10. The sealing body according to claim 1, wherein an outer surface of a segmented wall has a circular cross section, and wherein the outer diameter of the segmented wall decreases with increasing axial distance from the base.

11. A port entry device for telecommunication cables, comprising:
  a sealing body according to claim 1; and
  a compression element, comprising a conical surface for radially compressing the segmented wall around a cable in the passageway.

12. A port entry device, comprising:
  a sealing body according to claim 1, and
  two flanges, arranged and adapted for compressing the sealing body axially between them.

13. A kit of parts, comprising a closure for accommodating elements of a communication network, having a port for allowing entry of a telecommunication cable of the communication network into the closure, and a port entry device according to claim 11, engageable with the port, for sealed entry of the cable into the closure.

14. A communication network, comprising:
  a telecommunication cable,
  a closure for accommodating elements of the communication network, having a port for allowing entry of the cable into the closure, and
  a port entry device according to claim 11, engaged with the port, for sealed entry of the cable into the closure.

15. The sealing body according to claim 1, wherein each of the plurality of gaps is configured to become wider with increasing axial distance from the base.

* * * * *